March 7, 1933.  D. L. JACOBSON  1,900,398
PROCESS FOR THE REMOVAL OF HYDROGEN SULPHIDE FROM GASES
Filed May 14, 1930
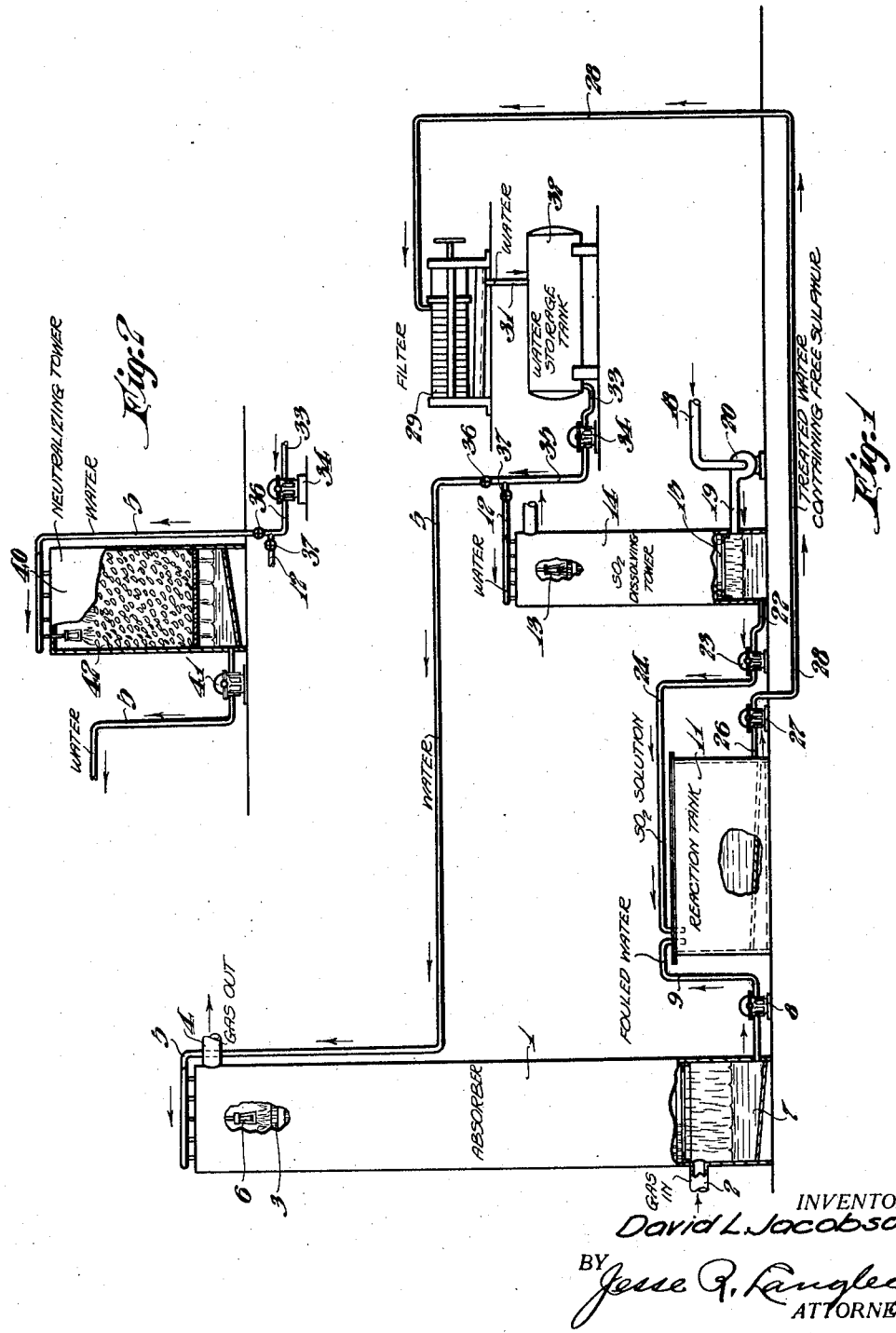

Patented Mar. 7, 1933                                              1,900,398

UNITED STATES PATENT OFFICE

DAVID L. JACOBSON, OF PITTSBURGH, PENNSYLVANIA, ASSIGNOR TO THE KOPPERS COMPANY OF DELAWARE, A CORPORATION OF DELAWARE

PROCESS FOR THE REMOVAL OF HYDROGEN SULPHIDE FROM GASES

Application filed May 14, 1930. Serial No. 452,380.

My invention relates to the removal of hydrogen sulphide from gases such, for example, as natural gas, coal gas, oil refinery gases, or air.

An object of the present invention is to provide a process of removing hydrogen sulphide from gases that shall be of particular utility with respect to the purification of gas containing large amounts of hydrogen sulphide.

A second object of my invention is to provide a process of purifying gases from hydrogen sulphide which shall be of a continuous and cyclic nature.

A further object of my invention is to provide a process of removing hydrogen sulphide from gases in which sulphur dioxide is employed for the purpose of fixing the hydrogen sulphide removed, but in which the purification medium coming in contact with the gas is of substantially neutral reaction.

A still further object of my invention is to provide a process of removing hydrogen sulphide from gases in which a solution of sulphur dioxide or sulphurous acid is employed for the purpose of fixing the hydrogen sulphide removed and in which the fixation reaction between the absorbed hydrogen sulphide and the sulphur dioxide or sulphurous acid takes place under optimum conditions.

My invention has for further objects such other operative advantages and results as may hereinafter be found to obtain.

In the copending application of Frederick W. Sperr, Jr., Serial No. 444,071, filed April 14, 1930, there is described a process of removing hydrogen sulphide from gases which comprises the treatment of the gas to be purified with a suitable liquid capable of absorbing hydrogen sulphide, the fixation of the absorbed hydrogen sulphide by means of sulphur dioxide, subsequent treatment of the liquid for the removal or neutralization of excess acidity and the recirculation of the thereby neutralized liquid.

In that copending application the absorbent liquid with which the gas to be purified is treated is subjected after contact with the gas to the action of a gas containing sulphur dioxide, for example, the fumes from a sulphur burner.

My invention contemplates the treatment of the gas with a preferably neutral or substantially neutral liquid as in the Sperr process and the subsequent treatment of the liquid with a solution of sulphur dioxide or sulphurous acid, as distinguished from a treatment of the liquid with a sulphur dioxide gas.

In its preferred embodiment, my invention further contemplates the substantially continuous recirculation of a body of absorbent liquid in such a manner that the body of absorbent liquid employed is initially divided into two streams, of which one is brought into contact with the gas to be purified for absorption of hydrogen sulphide therefrom, and the other is treated with sulphur dioxide gas for absorption of the same either as such or as sulphurous acid. After absorption of hydrogen sulphide and of sulphur dioxide, respectively, the two streams are commingled and the absorbed hydrogen sulphide then reacts with the sulphurous acid with liberation of elemental sulphur, substantially according to the following reaction:

$$SO_2 + 2H_2S = 3S + 2H_2O$$

The entire body of liquid is then subjected to a treatment for the removal of all or the major portion of the thereby liberated sulphur as, for example, by filtration, flotation, sedimentation or the like. That portion of the clear or relatively clear liquid to be recirculated over the gas being purified is then treated where necessary for the removal of excess acidity, while the remaining portion of the liquid is treated with sulphur dioxide as before.

This removal of excess acidity, herein designated as neutralization, may be accomplished in various ways, as for example by treating the liquid with a material capable of reacting with or neutralizing excess sulphur dioxide or sulphurous acid present in the recirculating liquid, but sparingly soluble or substantially insoluble in the original or neutralized washing liquid. That is, the washing liquid contains substantially no free sulphur dioxide or sulphurous acid.

For example, I may employ for neutralization of the liquid an alkaline earth metal compound such for example as lime, calcium carbonate or a material containing such a compound. Limestone may be used, and is in fact especially advantageous not only by reason of its low solubility in water alone, but by reason of its other characteristics. Magnesite and dolomite may also be employed.

Obviously, many other neutralizing agents may be employed, but substances of the class indicated above are especially advantageous in that they are fully effective to neutralize excess acidity of the liquid but do not tend to dissolve as such in the liquid to an extent sufficient to result in excessive consumption of the neutralizing agent beyond that required for neutralization alone.

It is also possible in many cases to accomplish a neutralization of the liquid in other ways. For example, the amount of sulphur dioxide employed in the commingling or fixation step may be just insufficient to react with all of the hydrogen sulphide present. That portion of the liquid to be recirculated over the gas being purified may then be treated where desired with air or other gas, as in the Sperr process, for the removal of all or substantially all of the remaining hydrogen sulphide from this portion of the liquid before recirculation thereof over the gas being purified.

In any case, according to the present invention, only that portion of the recirculated liquid which is to come in contact with the gas being purified need ever be specially treated for neutralization thereof.

A portion or all of the sulphur removed may be burned to produce the sulphur dioxide necessary for the fixation of the hydrogen sulphide absorbed from the gas, or, where desired, sulphur from outside sources may be employed for this purpose.

In order that my invention may be clearly set forth and understood, I now describe, with reference to the accompanying drawing, a preferred manner in which it is accomplished and carried out. In this drawing, Figure 1 is a more or less diagrammatic view partly in elevation and partly in vertical section of apparatus for effecting the purification of a gas in accordance with the present invention; and Fig. 2 is a similar view of additional apparatus which may be employed, when desired, with the apparatus shown in Fig. 1.

Similar reference numerals designate similar parts in both the views of the drawing.

Referring to Fig. 1, the gas to be purified is introduced to the bottom of an absorber 1 through a conduit 2. The gas passes upwardly through the absorber 1, the interior of which is filled with spaced contact media such as wooden hurdles 3, and leaves the top of the absorber 1 through a conduit 4.

I prefer to employ water or an aqueous solution as the recirculating absorbent agent. It will be obvious, however, that even if water containing substantially no dissolved material is initially employed, during the continuance of the process, more or less material, such for example as calcium sulphite and calcium sulphate, may be formed in the recirculating water. The presence of these or other materials does not interfere with the process, provided replacements with fresh water are made frequently enough to prevent excessive concentrations of dissolved substances.

During its upward passage through the absorber 1 the gas is subjected to intimate contact with a descending flow of water introduced to the top of the absorber 1 through a conduit 5 and suitable distributing devices 6, and is thereby purified by the removal therefrom of at least a considerable portion of its original hydrogen sulphide content.

The gas leaving the absorber 1 through the conduit 4 may be further purified if desired, or if sufficiently purified may be conveyed to any desired point for whatever use is desired.

The water, as aforesaid, passes downward through the absorber 1, becoming fouled by reason of absorption of hydrogen sulphide from the gas and is temporarily accumulated in a sump 7 which in the present instance is shown as conveniently occupying the lower portion of the absorber 1. The fouled liquid is withdrawn from the sump 7 by means of a pump 8 and is conveyed through a conduit 9 to a reaction tank 11.

In the meantime, a further portion of the total body of water used in the system passes through a conduit 12 and suitable sprays 13 into a sulphur dioxide dissolving tower 14, the interior of which is filled with suitably spaced contact devices 15, and is there treated with sulphur dioxide gas introduced to the tower 14 from a suitable source through conduits 18 and 19 by a fan 20.

Only a relatively small portion of the total recirculating body of water need be passed through the tower 14. During the passage of this portion of the water through the tower 14, it absorbs sulphur dioxide in the form of sulphurous acid and upon reaching the bottom of the tower 14 is then withdrawn through a conduit 22 and delivered by a pump 23 through a conduit 24 to the reaction tank 11.

In the reaction tank 11 the fouled water from the absorber 1 and the sulphur dioxide solution or sulphurous acid from the tower 14 are commingled and the hydrogen sulphide absorbed from the gas being purified is thereby decomposed with liberation of elemental sulphur.

The water containing the liberated sulphur is then drawn from the reaction tank 11 through a conduit 26 by a pump 27 and is delivered through a conduit 28 to a filter press 29 or other suitable separating device for the removal of all or the major portion of the sulphur therefrom. The clarified water then passes through a conduit 31 into a storage tank 32 from which it is drawn through a conduit 33 by a pump 34 and delivered through a conduit 35 to the branch conduits 5 and 12 having valves 36 and 37, respectively, for recirculation over the absorber 1 and the tower 14 as before.

The relative amounts of water which are passed through these conduits 5 and 12 are easily regulated by means of the valves 36 and 37 to give the results desired.

That portion of the liquid being delivered to the absorber 1 may be neutralized where necessary by addition thereto of lime, crushed limestone, calcium carbonate or other neutralizing material of low solubility in amount sufficient to neutralize all or substantially all of the sulphur dioxide or sulphurous acid present in the liquid.

This neutralization or substantial neutralization takes place, for example, according to the following reaction:

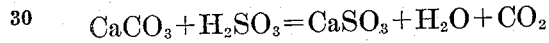
$$CaCO_3 + H_2SO_3 = CaSO_3 + H_2O + CO_2$$

This neutralization may be accomplished, for example, as in the manner shown in Fig. 2 in which a neutralizing tower 40 and pump 41 are inserted in the conduit 5 leading to the absorber 1. The interior of the neutralizing tower 40 is filled with coarse crushed limestone 42 or similar material offering comparatively little obstruction to the flow of the liquid but at the same time accomplishing an effective neutralization of the same. After leaving the tower 40 this portion of the liquid is delivered to the absorber 1 as before.

It is obvious that in this stage of the process, some solution of the limestone or other neutralizing material beyond that required for reaction with acidic constituents of the liquid may occur. This may in some cases result in imparting to the recirculating liquid a slightly alkaline reaction, depending upon the solubility and alkalinity of the neutralizing material in the liquid after removal of excess acidity. However, while it is desired to limit such additional solution of the alkaline material it may be pointed out that this has no harmful effect upon the process and in fact will exert a beneficial effect upon the absorption of hydrogen sulphide in the absorber 1.

On the other hand, as shown herein, the liquid may not be entirely neutralized, although complete or substantially complete neutralization is preferred.

It will be obvious that the process of my invention is adapted to be performed in a continuous manner and continuous operation is of course preferred, but this does not preclude the operation of the system or portions thereof in a semi-continuous or intermittent manner.

The amount and rate of recirculation of the absorbent liquid will depend upon its solvent properties with respect to hydrogen sulphide at the temperature and pressure at which the absorption takes place and can best be determined by experiment. When a high degree of absorption is required, it is preferred to bring the gas to be treated and the absorbent liquid together under pressures above atmospheric in order to promote the absorption of hydrogen sulphide in the absorbent liquid. Even where the gas is already under moderate pressure, considerable additional pressure may be resorted to when very high absorption efficiency is desired.

The amount of sulphur dioxide will of course be governed by the amount of hydrogen sulphide removed, but it will be obvious that it is desirable in most cases to employ at least no more than is required for neutralization of the hydrogen sulphide, or, as has been pointed out hereinabove, even less than that amount.

While the particular method of accomplishing the treatment of a portion of the liquid with sulphur dioxide which has been set forth hereinabove represents a preferred process, nevertheless other methods may be employed for this purpose.

It will be obvious to those skilled in the art that my invention is capable of modification with respect to its several details without departing from the scope thereof as expressed in the claims hereinafter made.

I claim as my invention:

1. The process of removing hydrogen sulphide from a gas which comprises washing the gas with a liquid for the absorption of hydrogen sulphide therefrom, removing said liquid after contact with the gas and commingling it with a further quantity of liquid containing sulphur dioxide in solution, whereby the absorbed hydrogen sulphide is decomposed and free sulphur is liberated, removing sulphur from the liquid, separating a portion of the liquid, treating it to effect a substantial neutralization thereof, and recirculating it for further treatment of gas.

2. The process of removing hydrogen sulphide from a gas which comprises washing the gas with a stream of liquid capable of absorbing hydrogen sulphide therefrom, treating another stream of said liquid for absorption of sulphur dioxide therein, commingling said streams of liquid, whereby absorbed hydroben sulphide is decomposed and free sulphur is liberated, removing at least a portion of said sulphur, dividing said commingled liquid into two streams for further absorption of hydrogen sulphide and sulphur dioxide, respectively, and again commingling said streams for further decomposition of hydrogen sulphide and removal of liberated sulphur, as before.

3. The process of removing hydrogen sulphide from a gas which comprises washing the gas with a stream of water capable of absorbing hydrogen sulphide therefrom, treating another stream of water for absorption of sulphur dioxide therein, commingling said streams of water, whereby absorbed hydrogen sulphide is decomposed and free sulphur is liberated, removing at least a portion of said sulphur, dividing said commingled water into two streams for further absorption of hydrogen sulphide and sulphur dioxide, respectively, and again commingling said streams for further decomposition of hydrogen sulphide and removal of liberated sulphur, as before.

In testimony whereof, I have hereunto subscribed my name this 8th day of May, 1930.

DAVID L. JACOBSON.